Jan. 23, 1962     L. D. MASSER     3,018,143
BEARING STRUCTURE FOR A ROCKABLE VEHICLE AXLE OR TRUNNION
Filed Feb. 17, 1958     2 Sheets-Sheet 1
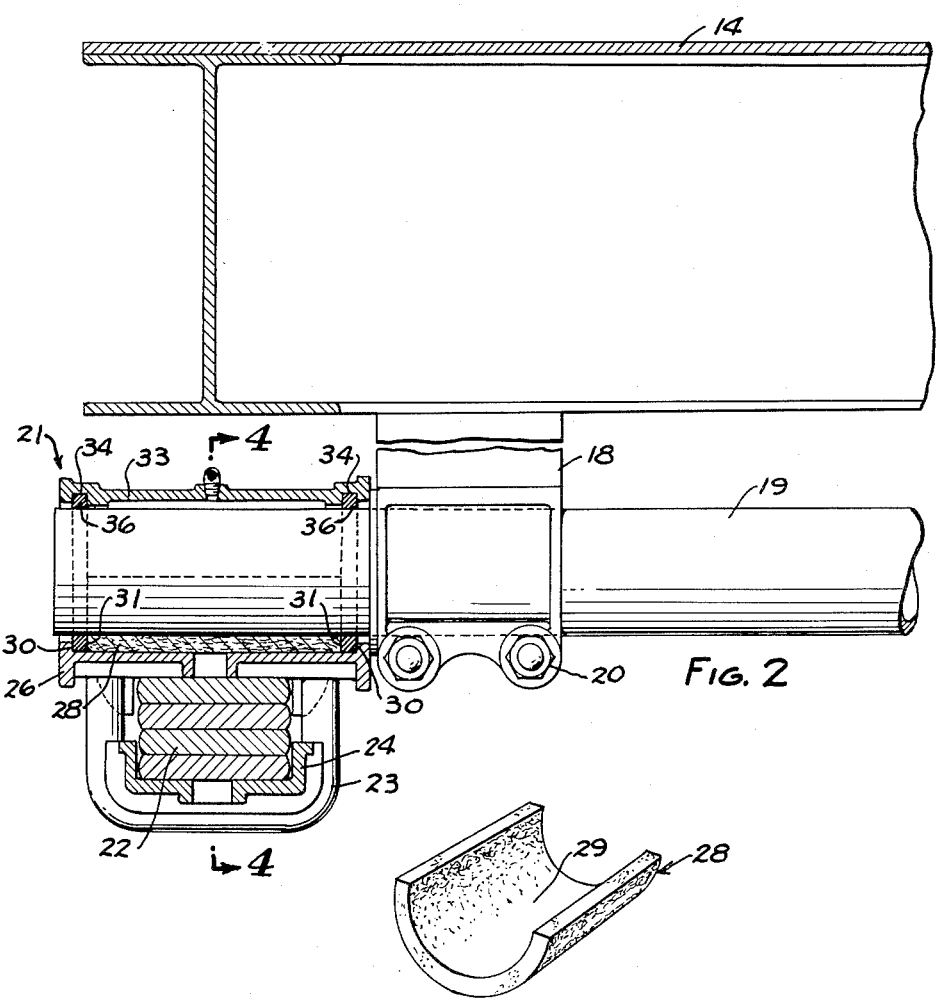
INVENTOR.
LLOYD D. MASSER
BY
ATTORNEYS

INVENTOR.
LLOYD D. MASSER
BY
ATTORNEYS

United States Patent Office 3,018,143
Patented Jan. 23, 1962

3,018,143
BEARING STRUCTURE FOR A ROCKABLE
VEHICLE AXLE OR TRUNNION
Lloyd D. Masser, Muskegon, Mich., assignor to Neway
Equipment Company, Muskegon, Mich., a corporation
of Michigan
Filed Feb. 17, 1958, Ser. No. 715,767
9 Claims. (Cl. 308—21)

The bearing of this invention is particularly adapted to supporting relatively heavily loaded axles, trunnions, or the like which rock about their axes on their bearings. An exemplary application of the invention is in supporting a trunnion or shaft which in turn supports a tiltable load carrying bed or body of a vehicle.

An object of the invention is to provide a simple, inexpensive bearing structure which eliminates the necessity of making the various parts with close tolerances and which insures relatively free rocking of a supported shaft under a wide range of temperature and humidity conditions.

The invention is carried out generally by providing a bearing element formed of a relatively inexpensive, nonmetallic material for load bearing rockable engagement with a shaft. A housing is provided for the bearing element and rings of resilient material yieldably hold the shaft against the bearing element so that the shaft can shift commensurately with variations in the bearing parts caused by changing temperature or humidity without binding in the bearing structure. One form of the invention is shown in the accompanying drawings.

FIGURE 1 is a generally elevational view of a vehicle having a tilting bed supported through a bearing structure according to this invention.

FIGURE 2 is an enlarged generally sectional view on line 2—2 of FIGURE 1.

FIGURE 3 is a perspective view of a bearing element according to this invention separate from the other parts.

Figure 4:
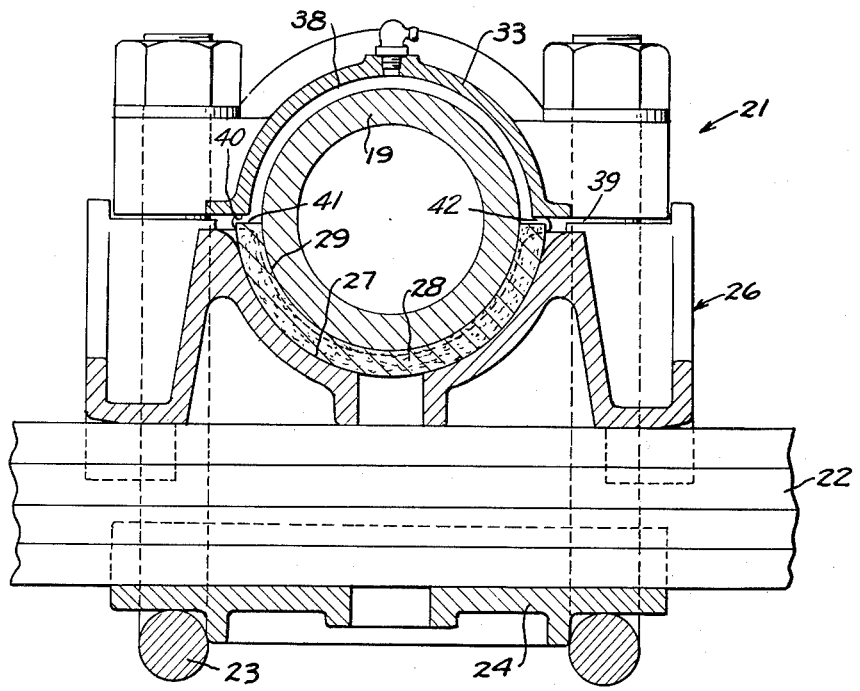
FIGURE 4 is an enlarged generally sectional view on line 4—4 of FIGURE 2.

Shown in FIGURE 1 is a portion of a vehicle 10 having tandem ground engaging wheels 11 and 12 suspended through a conventional leaf spring arrangement illustrated generally at 13 and having a rockable or tiltable bed 14. Bed 14 is illustrated as being of a type having one end 15 which can be swung downwardly to ground level so that a vehicle such as a track laying vehicle (not shown) can be driven onto it for transportation. Body member 14 could have other forms, for example the tiltable body of an ordinary dump truck adapted for carrying sand, gravel, coal, or the like.

Tiltable bed 14 has depending brackets 18 clamped around a trunnion or shaft 19 as by bolts 20. Trunnion 19 is rockably supported in load bearing relation within a bearing structure 21 secured to the leaf spring stack 22 of suspension 13 by such means as U bolts 23. A retainer cup 24 is shown as being interposed between the U bolts and bottom leaves of the spring stack.

Bearing structure 21 includes a base member 26 which rests on spring stack 22. The base member has a portion 27 forming a seat for supportingly receiving a bearing element 28. The bearing element conveniently has the form of a cylindrically shaped shell and seat 27 is shown as having a complementary cylindrical conformation. Bearing element 28 is formed of a tough, relatively light weight, inexpensive material such as a plastic or a non-metallic fibrous material. An example of a suitable plastic is nylon and an example of a suitable fibrous material is a material known commercially as Gatke which is in the nature of a relatively thick, form retaining brake liner material. The bearing material may be of woven or unwoven fibers which may or may not be reinforced by metallic strands. The bearing material may or may not be impregnated for self-lubrication. The term "generally non-metallic material" as used herein is intended to describe such materials as distinguished from a body of metal conventionally used as a bearing. Whatever material is chosen, it should have the ability to withstand the load and rocking movement of trunnion 19 when it is supported by base member 26 and should be relatively easily distortable or deformable to conform to the unmachined surfaces of seat 27 and shaft 19. In constructions where the load on the bearing will not be too great, the bearing element may be formed of a relatively tough rubber or the like.

The bearing element has a cylindrical inner surface 29 for rockably receiving trunnion 19 and the bearing element extends angularly through about 180° for reasons to be described. Base member 26 is provided adjacent its ends with shoulders 30 spaced from the ends 31 of bearing element 28 to define grooves as illustrated in FIGURE 2. The bearing structure also includes a cap 33 secured over the top of base 26 by U bolts 23. The base and cap cooperate to define an open-ended housing into which trunnion 19 extends for seating on bearing element 29. Cap 33 has internal circumferential grooves 34 aligned with the grooves formed by shoulders 30 and ends 31 of the bearing element.

A ring 36 of resilient material such as rubber, a plastic, or an elastomeric material, is seated in each of the complementary pairs of grooves in the cap and base and engages around trunnion 19. Rings 36 have a radial thickness generally equal to the thickness of bearing element 28 so that portions of the rings adjacent the ends of the bearing element are not compressed to any great degree. Grooves 34 in the cap are considerably shallower than the radial thickness of rings 36 so that the portions of the rings between cap 33 and trunnion 19 are compressed for yieldably holding trunnion 19 against bearing element 28. At the same time rings 36 support cap 33 out of contact with bearing element 28 as illustrated by clearance 38 in FIGURE 4. Cap 33 may also have a clearance 39 relative to base 26. Cap 33 has shoulders 40 opposed to and engagable with the upper edges 41 of bearing element 28 (FIG. 4) to secure the bearing element against any significant rotary shifting in its mount. A small clearance 42 is preferably provided between the bearing element edges 41 and shoulders 40.

In use, when bed 14 is tilted, preparatory to or subsequent to a loading or unloading operation, trunnion 19 rocks relatively freely on bearing surface 29 of bearing element 28. No significant resistance to this rocking motion is offered by rings 36. When vehicle 10 is in motion, any tendency of trunnion 19 to jump upwardly off of bearing surface 29 is prevented by the compressed upper portions (as FIGURE 2 is viewed) of rings 36.

During the course of normal use, trunnion 19, base 26, cap 33, and bearing element 28 may expand or contract under changing temperature conditions and bearing element 28 being formed of a non-metallic plastic or fibrous material may in some situations expand or contract under changing humidity conditions. The resilient mounting provided by the compressed upper portions of rings 36 for trunnion 19 and the fact that bearing surface 29 of the bearing member extends angularly not substantially more than 180° enables the trunnion to shift in clearance 38 relative to cap 33. For example, if U bolts 23 should contract under low temperature or if bearing element should thicken under high temperatures or under particular conditions of humidity, the result would be a mere partial closing of clearance 38. There would be no binding of trunnion 19 within the bearing structure. Clearance 42, while small enough to prevent any material shifting of bearing element 28, is large enough to accommodate any expansion of the bearing element.

The bearing structure is very inexpensive in that no machining of the relatively moving interfacing parts is necessary. The bearing element itself is very inexpensive. The cap and resilient ring arrangement for holding the trunnion against the bearing surface is also very inexpensive.

The resilient mounting for the trunnion offered by rings 36 makes it possible to use a cap and base and trunnion which are made with ordinary manufacturing tolerances which need not be closely interfitted. Nevertheless the bearing structure permits free rocking of shaft 19 and does not bind under varying conditions of temperature and humidity in which it is used.

In addition to providing a resilient mount for trunnion 19, rings 36 by engagement in their grooves and engagement against surfaces of the trunnion, form seals which exclude dirt, water, and other foreign substances from the interior of the bearing structure, thus prolonging the life of the bearing structure and minimizing maintenance. The seals also contain lubricant if used within the bearing structure.

Figure 5:
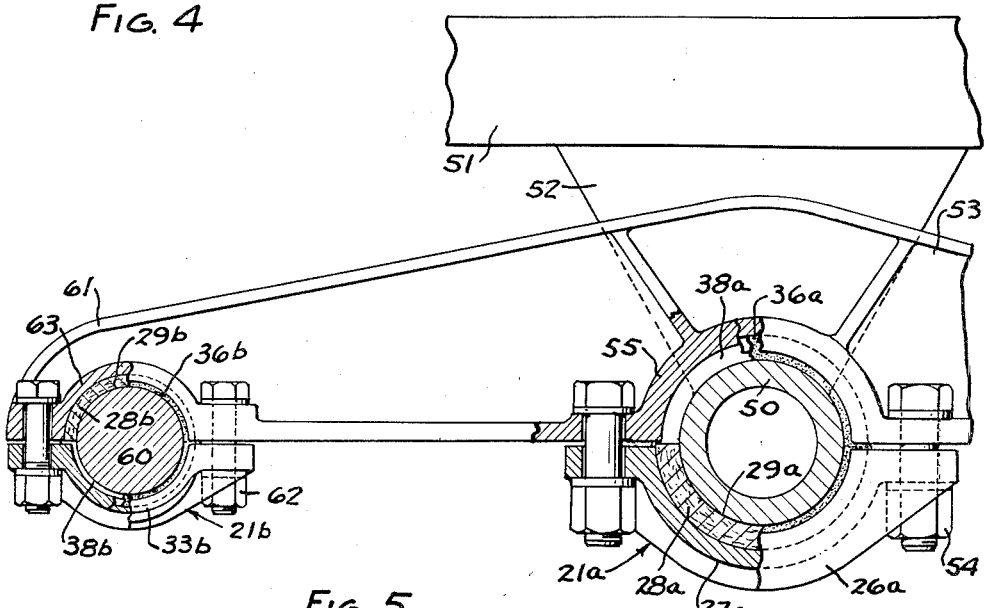
FIGURE 5 is a fragmentary partly diagrammatic elevational view with parts broken away, illustrating the bearing structure of this invention used in a walking beam.

Another example of a use of the bearing is illustrated in FIGURE 5 which shows a trunnion 50 anchored on a vehicle frame member 51 through a bracket 52 with a running gear member such as a walking beam 53 which functions in a generally conventional manner rockably mounted on the trunnion through a bearing structure 21a which is generally similar to bearing structure 21. Bearing structure 21a includes a base member 26a secured to beam 53 by bolts 54 and has a surface 27a on which bearing element 28a is supported. A recessed portion 55 of beam 53 forms the equivalent of cap 33 of FIGURES 2 and 3. Trunnion 50 is held rockably seated on surface 29a of the bearing element by resilient rings 36a in the manner illustrated in FIGURE 2 with the upper portion of the trunnion held out of contact with the opposed portions of beam 53 as indicated by clearance 38a.

An axle or shaft 60 which may be supported by ground engaging wheels (not shown) is rockably mounted adjacent an end portion 61 of beam 53 through a bearing structure 21b which is also similar to bearing structure 21 except that in this instance bearing element 28b is inverted for bearing on the top portion of shaft 60. A cap 33b fastened to the beam through bolts 62 holds shaft 60 rockably seated on surface 29b of the bearing element. A recessed portion 63 of the beam forms the equivalent of base 26 of FIGURES 2 and 3. Resilient rings 36b support shaft 60 out of contact with cap 33 in the manner shown in FIGURE 2 as indicated by clearance 38b.

Operation of bearing structures 21a and 21b is similar to that of bearing structure 21. When the vehicle traverses uneven ground, walking beam 53 rocks about trunnion 50 and rocks relative to shaft 60; the respective bearing structures facilitate this rocking without binding under varying temperature and humidity conditions in the manner described.

It has been found that vehicle suspension systems equipped with bearing structures according to this invention are up to several hundred pounds lighter than conventional arrangements because, by the use of this invention, it is possible to eliminate numerous relatively heavy machined metal bearing members.

What is claimed is:

1. In a vehicle wherein pay load is supported by a shaft such as an axle, trunnion, or the like and a member in rockable load bearing relation therewith, bearing means formed of a generally non-metallic material and having portions lying on a substantially cylindrical surface, said portions extending angularly not substantially more than 180°, means securing said bearing means substantially non-rotatably to said member, said shaft rockably engaging said portions of said bearing means in load bearing relation, said shaft and member having portions displaced angularly from said bearing means which are spaced apart relative to each other to define a space around the periphery of said portion of said shaft, said space being adequate to accommodate relative shifting of said portions of said shaft and member incidental to dimensional variations of the parts including said bearing means due to changes in temperature, humidity and the like, and yieldable means in said space compressed between said portions of said shaft and member so that the compressed material exerts force on said shaft in a direction toward said bearing means, said force being adequate to hold said shaft against said bearing surface in opposition to forces tending to disengage said shaft from said bearing surface incidental to operation of said vehicle, said material being yieldable to shifting of said shaft portion toward said member portion upon occurrence of said dimensional variations.

2. In a vehicle wherein pay load is supported by a shaft such as an axle, trunnion, or the like having a cylindrical surface portion and a member in rockable load bearing relation therewith, bearing means formed of a generally non-metallic material and having portions lying on a substantially cylindrical surface, said portions of said bearing means extending angularly not substantially more than 180°, means securing said bearing means substantially non-rotatably to said member, said surface portion of said shaft through about one-half of its circumference rockably engaging portions of said bearing means in load bearing relation, the other half of said surface portion of said shaft cooperating with portions of said member to define an annular space extending around said other half, said space being adequate to accommodate relative shifting of said shaft and member incidental to dimensional variations of the parts including said bearing means due to changes in temperature, humidity and the like, and a generally semi-circularly shaped body of resilient material in said space compressed between said member and shaft so that the compressed material exerts force on said shaft in a direction toward said bearing means, said force being adequate to hold said shaft against said bearing surface in opposition to forces tending to disengage said shaft from said bearing surface incidental to operation of said vehicle, said material being yieldable to shifting of said shaft toward said portions of said member upon occurrence of said dimensional variations.

3. In a vehicle having members such as frame members, body members, or running gear members which are rockably interconnected in load bearing relation through a shaft such as a trunnion, axle, or the like on one of the members and a bearing structure on the other member; improved bearing structure comprising, bearing means formed of a generally non-metallic material and having portions lying on a substantially cylindrical surface, said portions extending angularly not substantially more than 180°, a support mounted on said other vehicle member holding said portions of said bearing means in rockable engagement against the shaft, means forming a cap cooperating with said bearing means to define an opening within which the shaft is disposed, a body of resiliently distortable material supported by said cap in engagement with portions of the shaft angularly displaced from the portions engaged by said bearing means, said cap forming a clamp operative to compress portions of said material against the shaft so that said portions exert force against the shaft, said portions of said material being disposed substantially within the 180° of arc angularly displaced from that occupied by said bearing surface so that said force is directed toward said bearing surface, said force being adequate to hold the shaft against said bearing surface in opposition to forces tending to disengage the shaft from said bearing surface incidental to operation of the vehicle, said material being yieldable to an extend adequate to accommodate shifting of the shaft toward said cap caused by dimensional variations in the parts including said bearing means due to changes of temperature, humidity and the like.

4. The combination defined in claim 3 wherein said body of resiliently distortable material has surface portions lying on a substantially cylindrical surface which are directly engaged against said shaft.

5. The combination defined in claim 3 wherein said body of resiliently distortable material comprises a pair of rings extending generally around the interior of said opening, each of said rings having a portion disposed substantially within the 180° of arc angularly displaced from that occupied by said bearing surface, the inner surfaces of said ring portions being compressively engaged against the shaft by said cap, the other portions of said rings being generally free of the clamping influence of said cap so that the force exerted by said rings is directed toward said bearing surface.

6. The combination defined in claim 5 wherein said support and cap have generally aligned recessed portions within which the outer peripheral portions of said rings seat.

7. The combination defined in claim 5 wherein said bearing means has ends and said support has shoulders axially spaced from said ends to provide grooves within which said other portions of said rings seat, said cap having recesses generally aligned with said grooves within which the first mentioned portions of said rings seat.

8. The combination defined in claim 7 wherein said bearing means has a radial thickness generally at least as great as the radial thickness of said other portions of said rings.

9. The combination defined in claim 5 wherein said rings co-operate with said support, cap and shaft to form seals for excluding foreign matter from the interior of said structure.

References Cited in the file of this patent

UNITED STATES PATENTS

| | | |
|---|---|---|
| 1,840,435 | Davis | Jan. 12, 1932 |
| 1,967,027 | Hebner | July 17, 1934 |
| 2,284,646 | Eidal | June 2, 1942 |
| 2,408,200 | De La Mater | Sept. 24, 1946 |
| 2,626,839 | Creson et al. | Jan. 27, 1953 |
| 2,650,818 | Martin | Sept. 1, 1953 |
| 2,666,677 | Miller | Jan. 19, 1954 |
| 2,719,065 | Hornbostel | Sept. 27, 1955 |
| 2,760,831 | Kirk et al. | Aug. 28, 1956 |
| 2,784,009 | Braunberger | Mar. 5, 1957 |